Sept. 14, 1926.

W. A. HAEGELE

VEHICLE STOP MECHANISM

Filed July 2, 1925

1,600,111

WITNESSES

INVENTOR
William A. Haegele
BY
ATTORNEYS

Patented Sept. 14, 1926.

1,600,111

UNITED STATES PATENT OFFICE.

WILLIAM ANDREW HAEGELE, OF ELIZABETH, NEW JERSEY.

VEHICLE STOP MECHANISM.

Application filed July 2, 1925. Serial No. 41,155.

This invention relates to the class of mechanisms or apparatuses for preventing the translatory movement of a vehicle.

The prime object of the present invention is to improve mechanisms and apparatuses of this character by providing a mechanism or apparatus which will be more thoroughly efficient and effectual in carrying out the result looked for.

Another object of the invention is to mount the chocks in a novel manner so that they will function in conjunction with certain of the road wheels of the running gear of a vehicle so that there will be a more reliable and effectual application in the prevention of the translatory movement of the vehicle.

With the foregoing and other objects in view, the invention resides in the particular provision, relative disposition and combination of the elements or parts hereinafter fully described and illustrated in the accompanying drawing, in which—

Figure 1:
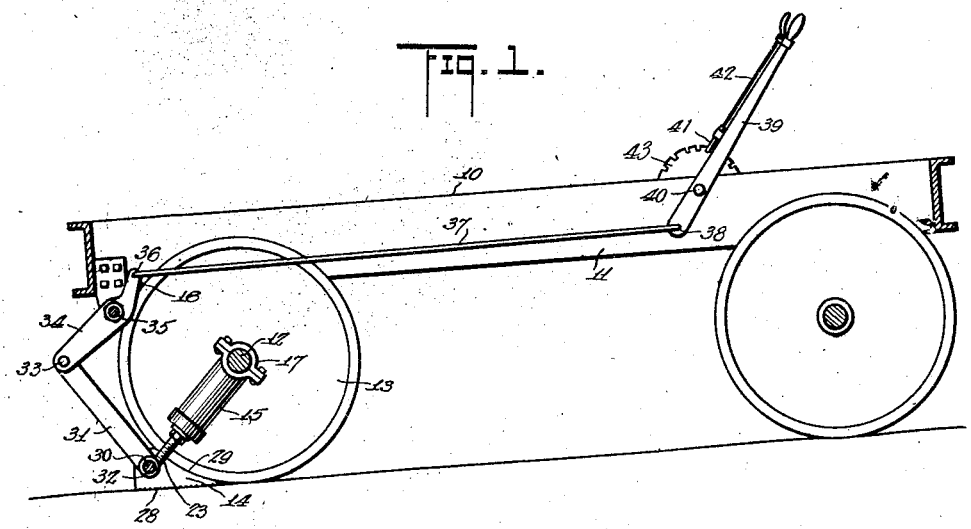
Figure 1 is a longitudinal sectional view through the running gear of a vehicle such as is used in connection with hoisting apparatus with the stop mechanism of the present invention applied thereto, the same being shown in condition for preventing the translatory movement of the running gear in one direction.
Figure 2:
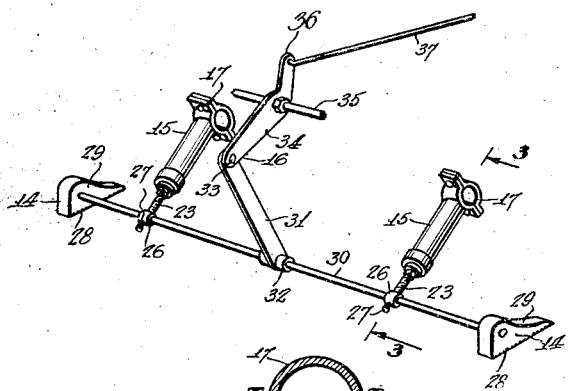
Fig. 2 is a perspective view of the main parts of the mechanism.
Figure 3:
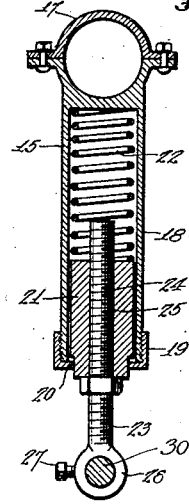
Fig. 3 is a detail sectional view through one of the radius devices.

In the practice of the present invention the stop mechanism or apparatus will be arranged for operation on the running gear of a vehicle which may be of any type. In the present instance the running gear 10 shown is of the type upon which hoisting apparatus is mounted. The running gear 10 includes a frame 11, axle 12 and road wheels 13.

The mechanism of the present invention with which the running gear is equipped, generally stated, comprises chocks 14, devices 15 which are preferably swingingly mounted from the axle 12 and which carry the chocks 14 to control them in the chocking or blocking operation and to swing them clear of the tread surfaces of the road wheels 13, and means 16 for lowering the chocks 14 to active positions and for raising the chocks to inactive positions.

More specifically stated the invention consists of the details and operates in a manner presently to be described. Each of the devices 15 comprises attaching means 17, a barrel 18 having a removable cap 19 with a hole 20 therein, a block 21 arranged for movement in the barrel 18, a spring 22 arranged in the barrel 18, which spring has a normal tendency to move the block toward the capped end of the barrel 18, and the element 23 which is screw threaded as at 24, the threads of which coact with the threads of a bore 25 in the block 21 to render the element 23 adjustable with respect thereto, and said element having an eye 26 and set screw 27. The chocks 14 may be made of any preferred wear-resisting material, and each is substantially wedge-shaped with a flat serrated portion 28 and a curved portion 29. A rod 30 is employed and one chock 14 is arranged at each end of the rod 30 and is fixedly secured thereto. The rod 30 extends through the eyes 26 of the devices 15, and the set screws 27 serve to tightly hold the rod in said eyes. The means 16 in the present embodiment, includes an arm 31 which is loosely connected as at 32 to the rod 30 and pivotally connected as at 33 to a lever 34 mounted for rocking movement on a shaft 35 carried in any suitable manner by the frame 11, said lever having connected thereto as at 36 a reach-rod 37 connected as at 38 to the lower end of a hand lever 39 pivoted as at 40. It will now be understood that upon movement of the lever 39 movement will be imparted to the lever 34 which in turn imparts movement to the arm 31 and as a result the chocks 14 at the discretion of the operator can be raised and lowered at will, partly controlled however by the devices 15 which have a normal tendency to throw the chocks 14 radially outward away from the tread surfaces of the road wheel when the chocks are being raised to inactive positions. The lever 39 carries the usual spring latch 41, means 42 for operating the same, and a segment 43 in the notches of which the latch 41 is adapted to be projected and from which it is withdrawn to hold the chocks in the different positions to which they are moved and to release the chocks.

From the foregoing it will be apparent that when the chocks 14 are thrown to the position shown in Fig. 1 they will be in contact with the road surface and respectively in the path of travel of the road wheels 13. In this position the chocks 14 will be under the influence of the devices 15 which tend to move said chocks away from the tread surfaces of the road wheels and which also function to permit the tread surfaces of the road wheels to frictionally impinge against the chocks curved portions 29. Rotation of the road wheels is prevented due to the impingement mentioned and the fact that the chocks are in contact with the road surface. The chocks are first brought into contact with the road surface which is followed immediately by the impingement of the tread surfaces, and this results in the prevention of the translatory movement of the vehicle.

I claim:—

1. The combination with the running gear of a vehicle including road wheels; of a stop mechanism including chocks capable of being moved to active positions in contact with the road surface in juxtaposition to the tread surfaces of said road wheels, said chocks being under the influence of means tending to move said chocks away from said tread surfaces and also functioning to permit the tread surfaces of said road wheels to frictionally impinge against portions of the chocks to prevent the rotation of the road wheels when the chocks are in contact with the road surface, means including a loose connection for effecting the movement of said chocks to inactive and active positions, and means for holding said chocks in their inactive positions.

2. The combination with the running gear of a vehicle including an axle and road wheels mounted on said axle; of chocks, devices extending radially from said axle which carry said chocks, mechanism connected to said chocks and operable to raise said chocks to inactive positions and to lower said chocks to active positions with respect to the tread surfaces of said road wheels, said mechanism including a rod connected to each of said chocks, an arm loosely connected to said rod, a bell crank lever, a hand lever, and a reach-rod connecting said hand lever and said bell crank lever.

3. In apparatus of the character described, chocks, road wheels with the tread surfaces of which said chocks coact, an axle on which the road wheels are mounted for rotation, and devices for controlling said chocks, each of said devices comprising attaching means by virtue of which the same is swingingly mounted on said axle, a barrel, a block arranged for movement in said barrel, an element having an eye adjustably carried by said block, and means in said barrel pressing against said block to move the same in one direction and permitting the same to be moved in an opposite direction; a rod, one of said chocks being supported at each end of said rod, said rod extending through the eyes of the elements of said devices and fixedly secured to said elements, and means connected to said rod for swinging said devices and to move said chocks into and out of operative relation to the road surface and the tread surfaces of said road wheels respectively.

WILLIAM ANDREW HAEGELE.